United States Patent [19]

Good et al.

[11] Patent Number: 4,988,118
[45] Date of Patent: Jan. 29, 1991

[54] AIR BAG AND METHOD OF FABRICATING SAME

[75] Inventors: Stanley B. Good, Richmond; John A. La Fond, Sterling Heights; Michael J. Lachat, Mt. Clemens; Dinesh B. Shah, Troy, all of Mich.

[73] Assignee: Allied-Signal Inc., Morris Township, Morris County, N.J.

[21] Appl. No.: 475,067

[22] Filed: Feb. 5, 1990

[51] Int. Cl.$^5$ .............................................. B60R 21/20
[52] U.S. Cl. ..................................... 280/743; 280/731
[58] Field of Search ....................... 280/731, 732, 743

[56] References Cited

U.S. PATENT DOCUMENTS 3,970,328  7/1976  Wallston .............................. 280/731

FOREIGN PATENT DOCUMENTS 2439222  2/1976  Fed. Rep. of Germany ...... 280/743

Primary Examiner—Kenneth R. Rice

[57] ABSTRACT

An air bag (50) comprising: a piece of material (52) suitable for use as an air bag or cushion defining a main panel; the main panel formed with opposing triangular portions (70,72) and a plurality of transition edges (100), wherein adjacent edges of the various triangular portions are sewn together and certain ones of the transition edges are sewn together to yield the assembled air bag.

19 Claims, 3 Drawing Sheets

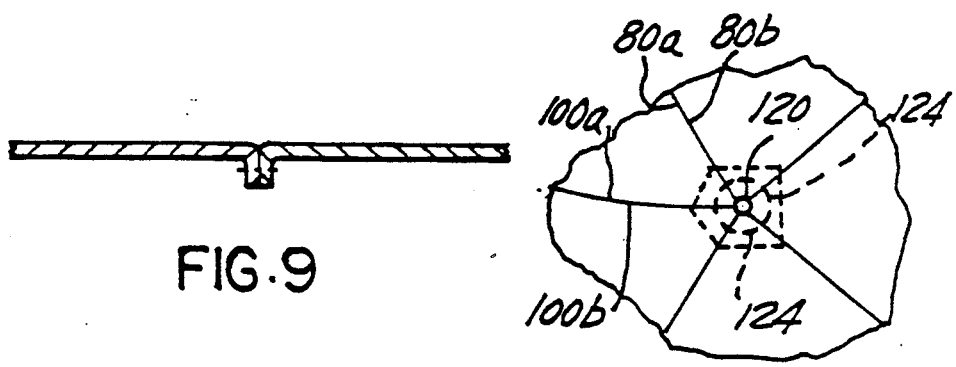
FIG. 9
FIG. 5
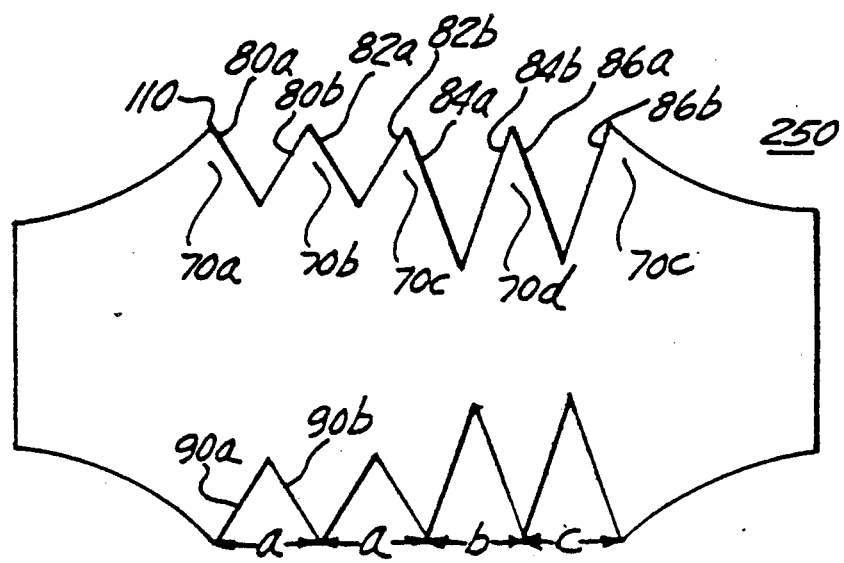
FIG. 10
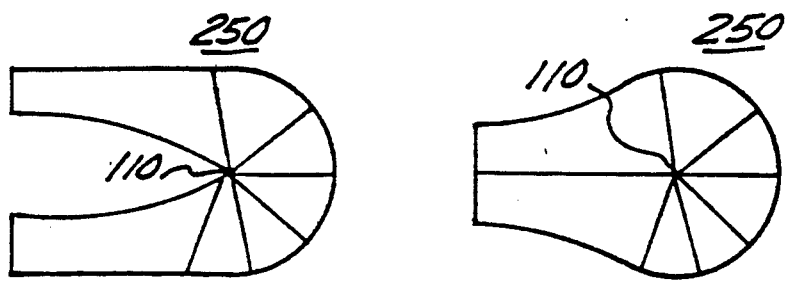
FIG. 11  FIG. 12

4,988,118

AIR BAG AND METHOD OF FABRICATING SAME

BACKGROUND AND SUMMARY OF THE INVENTION

The present invention relates to an improved air bag for a passenger safety system and more particularly to an air bag formed of a single piece of material and method of fabricating same.

Air bags or cushions have been proposed for use in passenger safety restraint systems for automotive vehicles. The type of air bag used to protect the driver typically has a generally circular balloon type shape when inflated. This bag, formed of two connecting pieces, is relatively small since its primary purpose is to protect only the driver. The passenger side air bag is typically used to protect the outboard seated passenger and, if applicable, the middle seated passenger. A passenger side air bag or cushion presents a relatively large frontal area to protect these passengers, and it has a relatively complicated shape. FIG. 1 is illustrative of a prior art passenger side air bag fabricated from a main panel 20, having a narrowed neck portion 22 and two isoconic (kidney) shaped side panels 26 (only one of which is shown). Each side panel includes a narrowed neck portion 28. The main panel 20 is stitched about a long, arcuate seam 24 to each side panel 26. The main panel forms a top 30, front 32, and bottom 34 of this type of air bag. The significance of the dotted line 150 is discussed below.

The attachment of the main panel 20 to the two side panels 26 is accomplished by sewing along the seam 24. If sewing is done manually, the procedure is cumbersome and complicated due to the length and curved nature of the seams. It has been proposed that the sewing be performed in an automated manner which could require use of three-dimensional sewing machines utilizing at least three axis movements (X,Y,Z). The capital investment in this type of machine is very costly and the process of sewing utilizing these three-dimensional sewing machines is relatively complicated.

The present invention provides an air bag or cushion fabricated of a single piece of material. The material is configured in a manner such that the resulting sewing operations are along straight or slightly curved stitch or sewing patterns. These stitch or sewing patterns when sewn will define the shape of the bag and can be performed utilizing standard sewing machines avoiding the necessity of utilizing the more costly three-dimensional sewing machine.

It is an object of the present invention to provide an air bag that is simple to manufacture and one that can be fabricated from a single piece of material. Another object of the present invention is to provide an air bag which utilizes a minimum amount of material.

Accordingly, the present invention comprises: an air bag formed of a single piece of material having a plurality of triangular portions extending outwardly from a main section of material. The edges of adjacent triangles are joined together such as by sewing to form parts of the side panels of the air bag. More specifically, the preferred embodiment of the air bag comprises: a generally oblong piece of material suitable for use as an air bag or cushion including: first and second ends, and first and second sides opposingly situated when the material is laid flat. The first side includes a plurality of adjacent first triangular-like shapes and the second side includes another plurality of adjacent second triangular-like shapes. Each side includes a transition edge extending from a respective end to an edge of certain triangular-like shapes. Adjacent edges of the various triangular-like shapes and certain pairs of the transition edges are sewn together to form the material into the desired shape of an air bag.

Many other objects and purposes of the invention will be clear from the following detailed description of the drawings.

BRIEF DESCRIPTION OF THE DRAWINGS

In the Drawings:

FIG. 5 illustrates an enlarged view of the portion of the air bag shown in FIG. 4.

FIG. 9 illustrates a hem or seam.

FIGS. 10, 11 and 12 illustrate a further embodiment of the present invention.

DETAILED DESCRIPTION OF THE DRAWINGS

Figure 2A:
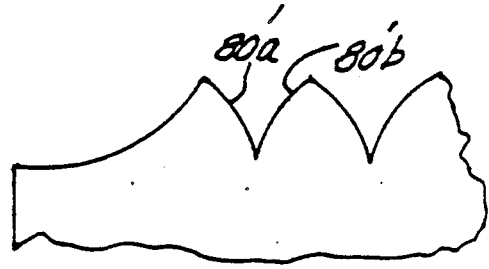
FIG. 2a illustrates an alternate embodiment of the invention.
Figure 2:
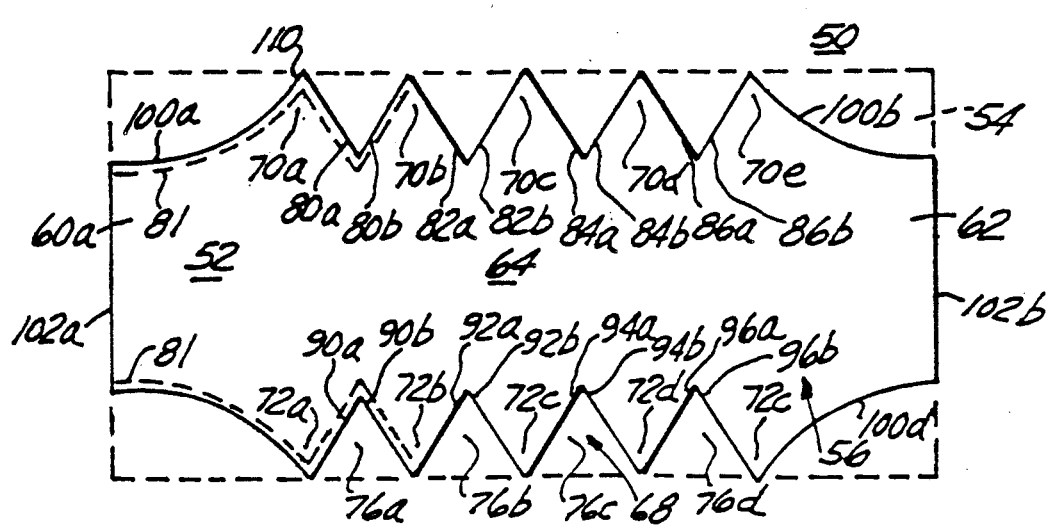
FIG. 2 illustrates a plan view of the main panel of air bag material used to fabricate the present invention in a flat, laid out configuration.

With reference to FIG. 2 there is shown an air bag 50 during an early stage of fabrication. In this embodiment, the air bag 50 is fabricated from a single sheet of material 52 suitable for use as an air bag or cushion. Typically, the material used for air bags is fabricated of a nylon having various weave densities such as 420 denier nylon 72×46 or 49.5×49.5, 840 denier nylon having a weave density of 32×32, or 630 denier nylon with weave density of 38×38, etc. Initially the material 52 may be fabricated to a generally rectangular or oblong configuration shown by the dotted lines 54. This piece of material forms a main panel 56 which is shaped in the manner described below. More specifically, the main panel comprises two generally narrowed end sections 60 and 62 respectively, a middle section 64, and side sections 66 and 68. Formed within these side sections 66 and 68, in generally what could be called the middle section 64, are a plurality of triangular-like or wedge shapes or elements 70a–e and 72a–e. These elements may be formed by cutting wedge shaped cut outs 74a–d and 76a–d from the respective side sections 66 and 68. In the embodiment show in FIG. 2, four wedge shaped portions have been removed from each of the side sections 66 and 68 resulting in five generally wedge shaped or triangular-like elements 70a–e and 72a–e. It should be appreciated, however, that this configuration is not a limitation of the present invention in that more or less wedge shaped elements may be used.

With respect to the triangular-like elements (of material remaining after the removal of the various wedge shaped cut outs), there can be seen that each set of triangular-like elements includes a plurality of inwardly and outwardly extending edges such as 80a,b–86a,b in the side section 66, and 90a,b–96a,b in the side section 68. As will be described below, these various edges form a plurality of straight line sewing edges or patterns used in the fabrication of the present air bag 50. While straight edges are used in this embodiment of the invention, wedge sections having arcuate edges such as 80′a, 80′b shown in FIG. 2a are within the scope of the present invention. These arcuate edges can be either convex, as shown, or concave. The degree of curvature of these edges 80′a, etc. may assist in defining the final shape of the air bag or cushion 50.

It should be noted that the outermost edges of the first (rightmost) 70a and 72a and last 70e (leftmost) and 72e triangular-like sections need not be formed by a straight edge as is the case with the interior triangular-like elements. These outer edges of the first and last triangular shaped elements, in each side 66 and 68, are formed by transition edges 100a-d extending outwardly toward a respective end 102a or 102b of the material 52. In a general sense, however, the transition edges may be concave, convex, straight, or slightly curved.

The material 52 is formed into a completed air bag 50 utilizing the following procedure. With respect to the triangular shapes 70a-70e formed in the side section 66, adjacent edges such as 80a and 80b are moved together and sewn along the common length of these edges about a hem, seam, stitching pattern or sew line such as 81 (see FIG. 9). Similarly, adjacent edges of the other triangular-like sections such as 72a-b and 74a-b in the side section 66 are respectively moved and sewn together. Similar sewing operations are performed to join adjacent edges 90a,b-96a,b in the other side section 68.

Figure 3:
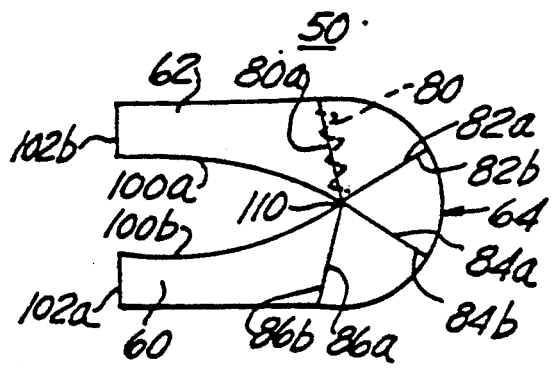
FIG. 3 illustrates the present air bag in a partial stage of completion.

After the above-described sewing operations, the resulting shape of the air bag in this partial stage of construction will, of course, no longer be the planar shape illustrated in FIG. 2. The material used in the manufacture of an air bag does not have a self-defining structure. If one assumes, for the purpose of visualization, that the air bag material does have some degree of rigidity to offer a self-defining shape, then after the above-described sewing operations, the partially completed air bag would take a form such as shown in FIG. 3. More particularly, the apex 110 of each of the triangular-like elements or shape 70a-c, by virtue of the sewing operation of the adjacent edges 80a,b-86a,b, meet at a common, generally central point which is also shown as 110. It should also be appreciated that the configuration resulting from the sewing of the triangular-like sections 72a-e formed in the other side section 68 of the material 52 will form a shape opposite from and identical to that as shown FIG. 3. In the configuration shown in FIG. 3, the middle section 64 of the material 52 forms the frontal face of the air bag 50 with the end sections 60 and 62 extending rearwardly therefrom with pairs of transition surfaces 100a,b and 100c,d separated from and generally opposite one another.

The next step in the fabrication of the air bag 50 requires the joining of the now oppositely positioned transition surfaces 100a and 100b shown in FIG. 3 and the corresponding transition surfaces 100c and d on the other side of the air bag 50. This joining is accomplished by sewing these opposing transition surfaces along their length, or along sew line 81, from the respective ends 102a and b, toward the common point 110, resulting in a completed air bag shape shown in FIG. 4, the sewn together ends forming an opening into which inflation gas may be received. The sewn bag 50 may then be turned inside out such that any of the unfinished edges at each of the seams or hems will reside inside the completed air bag 50. It should also be appreciated that as a result of the various sewing operations along the above-described sewn together edges, the material at the common point 110 may not be sewn together, although the various pieces of material are extremely closely spaced. This spacing is shown by the circle 120 in the enlarged view of FIG. 5. This slight spacing may be taken advantage of since it is often desirable to place vent holes in the side portions of an air bag to assist in venting the inflation gas therefrom. As such, this spacing 120 may be used as a vent hole also shown as 120. If the need arises, this vent hole 120 may be eliminated during the sewing operation of the mating transition edges 100a,b and 100c,d during which the fabric proximate the vent hole 120 may be pinched and sewn together. Alternatively, a material patch such as 122 (shown in phantom lines) may be sewn about the vent hole 120 area. Further, if it is desired to maintain a venting area in the sides of the air bag, it is also envisioned that the sewing along the various common edges such as 80a and b may stop at a predetermined distance shown by a dotted circle 124 from the common point 110 thereby establishing a larger or smaller non-sewn portion defining the vent hole area.

Figure 6:
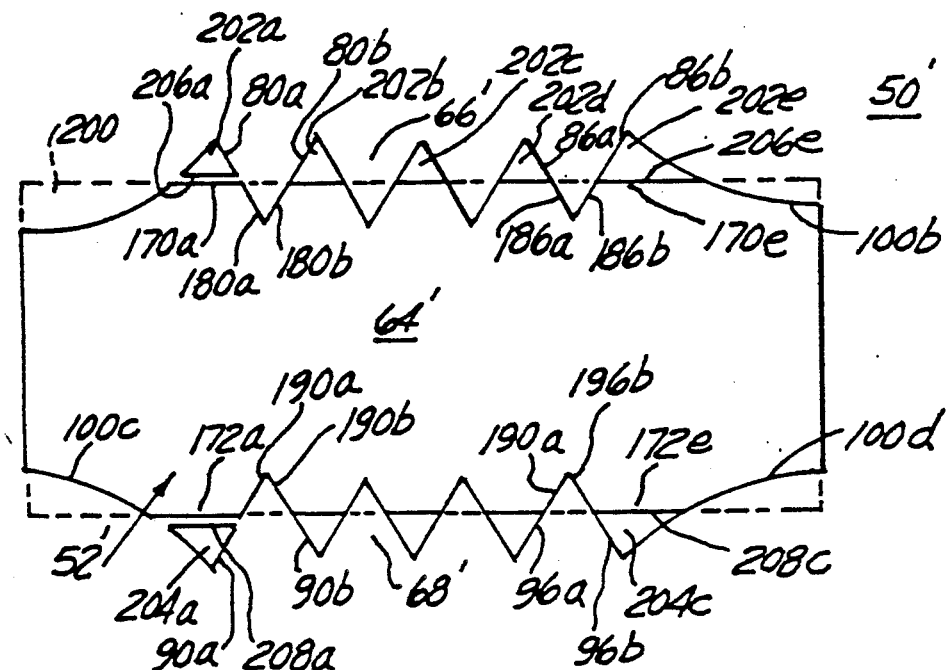
FIGS. 6, 7 and 8 illustrate an alternate embodiment of an air bag in accordance with the present invention.

FIG. 6 illustrates an alternate air bag 50′ formed of a generally oblong or rectangular piece of air bag material 52′. The overall width dimension of the material 52′ is somewhat narrower than the width of material 52 shown in FIG. 2. Formed within the various sides 66′ and 68′ of the material 52′ are a plurality of generally truncated triangular-like shapes 170a-e and 172a-e having adjacently positioned inwardly and outwardly directed edges 180a,b-186a,b in side 66′ and edges 190a,b-196a,b in side 68′. The purpose of utilizing the narrow width material 52′ is to optimize material utilization and to minimize the overall material cost of the air bag 50′. To achieve the generally fully formed triangular-like shapes such as 70a-e and 72a-e, shown in FIG. 2, the air bag 50′ of FIG. 6 utilizes triangular shaped scraps of material resulting perhaps from the portions 200 of the rectangular sheet of air bag material which are removed or cut away. One of these triangular sections or tips is shown as 202a in isolation relative to the truncated triangular-like shape 170a. A plurality of these triangular shapes 202a-e and 204a-e are sewn along hem lines, sew lines or sew patterns 206a-e and 208a-e to the respective truncated triangular-like sections 170a-e and 172a-e, respectively. After the attachment of these triangular tips 202 and 204 to the air bag material 52′, the resulting configuration yields the fully formed triangular-like elements substantially identical in form to those shown in FIG. 2 with the exception of the horizontal sew patterns 206 and 208.

Figure 4:
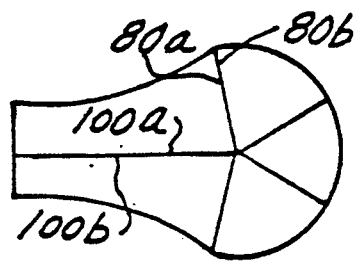
FIG. 4 illustrates the present air bag in its completed state of fabrication.
Figure 7:
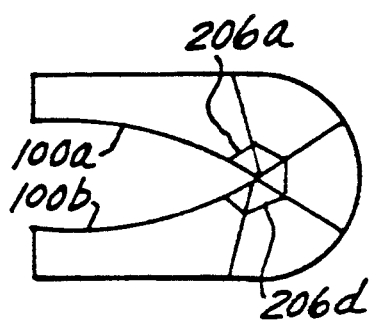
Figure 8:
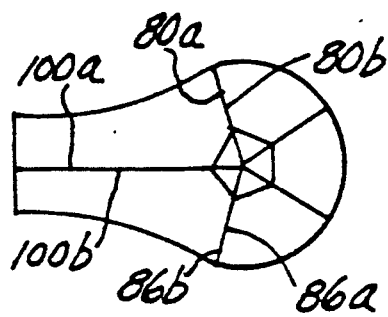

Thereafter, the air bag 50′ is fabricated following the method described with relation to the air bag shown in FIGS. 2-4 by first sewing together the respective adjacent edges of the triangular-like sections 80a,b-86a-b and 90a,b-96a,b to form the intermediate shape illustrated in FIG. 7. The sewing operation is completed by joining the corresponding transition surfaces 100a,b and 100c,d to yield the configuration shown in FIG. 8.

FIG. 9 is illustrative of a sewn together hem, seam or sewing pattern illustrating the butted together edges 80a and 80b joined together by stitching shown as 210, which may be of a chain or cable stitch pattern.

From the above descriptions of the various embodiments of the invention, it can be appreciated that the triangular-like elements 70 and 72 can be formed with straight or curved edges and can be formed by one or more pieces of material. FIGS. 10-12 illustrate a further embodiment of the invention in which the triangular-like elements 70a-c and 72a-c are formed of different sizes and wherein the pitch distance (i.e., a,b,c, etc.) between adjacent triangular-like elements, i.e., the distance between the apexes may vary as well as the height (from apex to base) of individual triangular-like shapes may vary. By forming the triangular-like sections of different sizes and with varying pitch diameters affords the opportunity to further shape the exterior dimension of the inflated air bag such that, for example, the resulting shape as illustrated is somewhat more isoconically shaped than the air bag shown in FIGS. 4 or 8. In this embodiment of the invention the various edges such as 80a and b and 90a and b, etc., are joined together in the manner described above.

Figure 1:
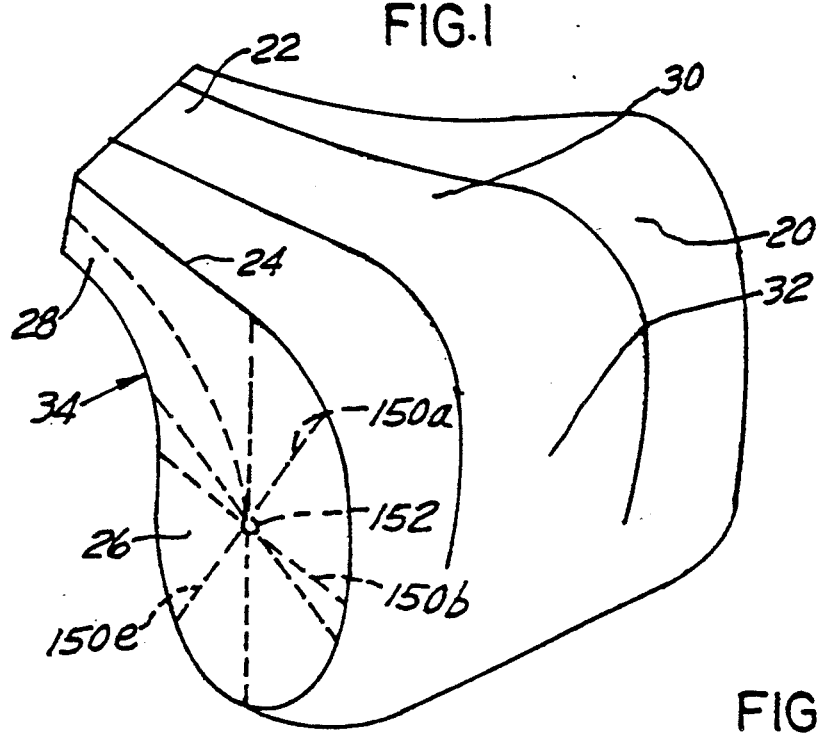
FIG. 1 is illustrative of a prior art passenger side air bag.

A further appreciation of the last described embodiment of the invention may be obtained from the following discussion. Reference is again made to the air bag shown in FIG. 1 and in particular to the dotted lines 150a-h. The present invention can be used to form an air bag in a variety of shapes and sizes such as the generally circular shaped driver side bag as well as which approximates the isoconic (kidney) shape of the air bag shown in FIG. 1. The dotted lines 150 are indicative of potential sew lines. To approximate the shape of the air bag in FIG. 1, using the present invention, a common point such as 152 is located. Potential sew lines 150 are then identified which emanate from the common point 152. It is thought that material utilization will be increased if the common point 152 is chosen such that opposing extending sew lines are approximately of the same length. If the air bag of FIG. 1 is now cut along the potential sew lines 150 and the material laid as flat as possible, one will obtain a template somewhat resembling the material configuration of FIG. 10 which can be used, with some modification, to generate a final flat one piece pattern which when assembled will approximate the shape of the air bag of FIG. 1. As may be appreciated from FIG. 1, the resulting flat pattern may include triangular shapes of different widths, with varying apex-to-base dimensions and wherein the distance from the centerline of the material to any apex may vary.

Many changes and modifications in the above described embodiment of the invention can, of course, be carried out without departing from the scope thereof. Accordingly, that scope is intended to be limited only by the scope of the appended claims.

We claim:

1. An air bag (50) comprising:
a piece of material (52) suitable for use as an air bag or cushion defining a main panel; the main panel (20) including:
first (60,102a) and second opposingly situated ends (62, 102b) and first (66) and second (68) opposingly situated sides;
the first side (66) including a plurality of first triangular-like shapes (70) and first (100a) and second (100b) transition edges extending from the certain ones of the first triangular-like shapes to the first and second ends respectively;
the second side (66) including a plurality of second triangular-like shapes (72) and third (100c) and fourth (100d) transition edges extending from the certain ones of the second triangular-like shapes to the first and second ends respectively;

wherein adjacent edges of the plurality of first triangular-like shapes are joined together, adjacent edges of the plurality of second triangular-like shapes are joined together to form a configuration wherein the first and second and third and fourth transition edges are in relative opposition to one another and wherein the first and second and third and fourth transition edges are respectively joined together.

2. The air bag (50) as defined in claim 1 wherein the material used to form the main panel, prior to the joining of the edges, is capable of being laid flat.

3. The air bag (50) as defined in claim 1 wherein the main panel is formed of a generally oblong shaped material (52).

4. The air bag (50) as defined in claim 1 wherein the various edges are respectively joined together by sewing.

5. The air bag (50) as defined in claim 1 wherein the various edges are generally straight.

6. The air bag (50) as defined in claim 1 wherein the various edges are arcuately shaped.

7. The air bag (50) as defined in claim 1 wherein each of the first and second plurality of triangular-like shapes are substantially of the same size and shape.

8. The air bag (50) as defined in claim 1 wherein each triangular-like shape of the first and second plurality of triangular-like shapes include edges which converge at a respective apex and include a base formed as an integral part of the main panel.

9. The air bag (50) as defined in claim 1 wherein some of the first (70) and second (72) triangular-like shapes have differing dimensions relative to other ones of the first and second triangular-like shapes.

10. The air bag (50) as defined in claim 1 wherein a vent hole (120) or opening is defined in the material proximate a location where apexes of the first and second triangular-like shapes are respectively positioned.

11. The air bag (50) as defined in claim 10 including a patch (122) of additional material (52) about the vent hole (120) for enclosing same.

12. The air bag (50) as defined in claim 1 wherein various triangular-like shapes are formed by at least two joined pieces of air bag material.

13. The air bag (50) as defined in claim 12 wherein a triangular-like shape is formed by a first truncated triangular shape in the main panel and an additional, fully formed triangular piece of material joined to the truncated triangular shape.

14. A method of fabricating an air bag (50), the air bag comprising: a piece of material (52) suitable for use as an air bag or cushion defining a main panel; the main panel including: first (60,102a) and second opposingly situated ends (62, 102b) and first (66) and second (68) opposingly situated sides; the first side (66) including a plurality of first triangular-like shapes (70) and first (100a) and second (100b) transition edges extending from the certain ones of the first triangular-like shapes to the first and second end respectively; the second side (66) including a plurality of second triangular-like shapes (72) and third (100c) and fourth (100d) transition edges extending from the certain ones of the second triangular-like shapes to the first and second ends respectively;
the method comprising the steps of:
(1) forming the main panel;

(2) positioning respective adjacent edges of the first triangular-like shapes together and joining such adjacent edges together, (3) positioning respective adjacent edges of the second triangular-like shapes together and joining such adjacent edges together, (4) respectively positioning the first and second and third and fourth transition edges together and joining same.

15. The method as defined in claim 14 wherein the step of forming the main panel includes fabricating each triangular-like shape of a plurality of pieces of air bag material.

16. The method as defined in claim 15 wherein the step of forming includes fabricating each triangular-like shape as a first truncated triangular form in the main panel and attaching thereto a fully formed additional triangular piece of air bag material.

17. The method as defined in claim 14 wherein the joining of the various edges is performed by sewing.

18. The method as defined in claim 14 wherein step (2) of joining includes joining such adjacent edges together such that apexes of the first triangular-like shapes meet at a generally common location.

19. The method as defined in claim 18 wherein the step of joining forms at the common location an opening in the air bag material.

* * * * *